United States Patent [19]

Farmont

[11] Patent Number: 4,927,208
[45] Date of Patent: May 22, 1990

[54] SUN ROOF FOR VEHICLES

[76] Inventor: Rolf Farmont, Hortensienstrasse 17, 4000 Düsseldorf 30, Fed. Rep. of Germany

[21] Appl. No.: 299,360
[22] PCT Filed: Apr. 10, 1988
[86] PCT No.: PCT/EP88/00299
  § 371 Date: Feb. 22, 1989
  § 102(e) Date: Feb. 22, 1989
[87] PCT Pub. No.: WO88/08375
  PCT Pub. Date: Nov. 3, 1988

[30] Foreign Application Priority Data

Apr. 30, 1987 [DE] Fed. Rep. of Germany ... 8706217[U]

[51] Int. Cl.$^5$ .............................................. B60J 7/04
[52] U.S. Cl. ................................. 296/216; 296/218; 49/485
[58] Field of Search ............... 296/216, 218, 214; 49/485, 493

[56] References Cited

U.S. PATENT DOCUMENTS

| | | | |
|---|---|---|---|
| 4,115,955 | 9/1978 | Aldrich | 296/218 |
| 4,394,044 | 7/1983 | Hough et al. | 296/218 |
| 4,585,269 | 4/1986 | Lievesley | 296/214 |
| 4,666,206 | 5/1987 | Haugh | 296/218 |
| 4,750,781 | 6/1988 | Betteridge | 296/216 |
| 4,783,116 | 11/1988 | Haugh | 296/218 |

Primary Examiner—Robert R. Song
Attorney, Agent, or Firm—Tarolli, Sundheim & Covell

[57] ABSTRACT

A sun roof to be installed in a roof opening (3) of a vehicle (1) in which a rigid lining (solid canopy 10) is located beneath the roofing (2) in which the sun roof (6) is to be installed. The sun roof comprises at least a cover (7) which can be opened and closed, and a multiple-part frame (4) which can be clamped directly against the roofing (2) and including a one-piece outer frame part (5) circumscribing the roof opening (3) and which can be installed in the roofing from above, a one-piece inner frame part (9) circumscribing the roof opening (3) which can be fixedly joined with the outer frame part (5) in the zone within the roof opening (3), and which is supported directly against the roofing (2) from beneath, and (preferably) an anchoring member (19, 20, 20B, 21) supported against the solid canopy (10) from beneath. For such a sun roof, the opening (3) in the roofing (2) may be exactly as large as the opening in the solid canopy beneath it. Therefore, the solid canopy need not be cut back, relative to this roof opening, as it had to be done in the past (on at least one, but preferably on several opening edges), when the roofing had to be clamped directly between the outer and inner frame parts. This is attained by providing the inner frame part (9) in its area (a) located beneath the roofing (2) with a flange (clamping flange (18)) which can be pushed into the space between the roofing (2) and the solid canopy (10).

12 Claims, 5 Drawing Sheets

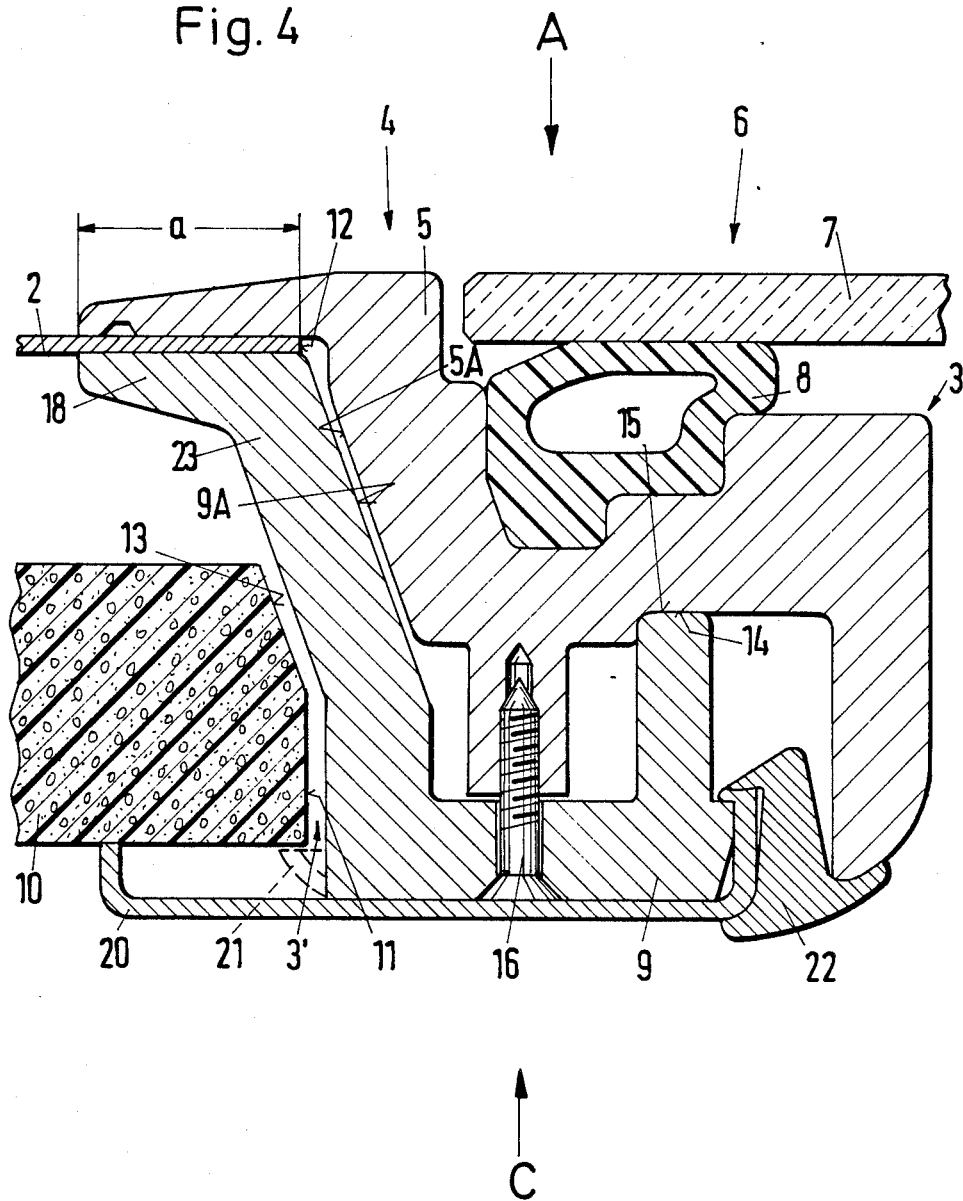

SUN ROOF FOR VEHICLES

The invention relates to a sun roof to be installed in a roof opening of a vehicle in which a rigid lining (solid canopy) is located beneath a roofing in which the sun roof is to be installed. The sun roof comprises at least a cover, substantially aligned with the roofing and which can be opened and closed and, in particular, can be pushed along or raised at the rear end thereof, or pushed along or raised at the rear end thereof and lowered, and a multiple part frame which can be clamped directly against the roofing; so that, when the frame is mounted, only the roofing and no other part of the vehicle roof such as the lining, for example, is clamped between the parts of the frame. The frame comprises a one-piece outer frame part which surrounds the roof opening and can be installed in the roofing from above, a one-piece inner frame part, which can be fixedly connected with the outer frame part in the area of the roof opening by connecting/fastening elements and which is supported against the roofing from beneath, and (preferably) an anchoring member that supports the solid canopy from beneath.

A sun roof of this kind is disclosed, among others, in German Pat. No. 3,241,652. In this known sun roof, a vertical clamping leg extending substantially perpendicular to the roofing from the inner frame part, is supported by its relatively small end surface against the roofing from beneath and clamps the latter to the outer frame part. With this known sun roof, the roof opening must first be cut out in the roofing of the vehicle. Then, in the lining (solid canopy) of the vehicle roof, an opening larger than the roof opening must be made, so that the opening in the solid canopy would circumscribe the opening in the roofing and would be spaced therefrom a certain distance. This process of "cutting back" is time-consuming and can only be made from beneath, and thus in an inconvenient work position.

In other sun roofs for vehicles now on the market, the cutting back of the solid canopy is avoided by cutting an opening in the solid canopy of the same size as the opening in the roofing. But there, the roof frame is not clamped directly against the roofing but, rather, the inner frame part is supported from beneath against the solid canopy. Since the solid canopy can be compressed, the clamping forces acting against the roofing may be relatively small.

Finally, another sun roof for vehicles, also now on the market, comprises a frame that includes an outer frame part which is a light metal molded part with appropriate rigidity. This outer frame part is screwed to a plurality of clamping members supported from beneath directly against the roofing. Although, in this known sun roof, the solid canopy is not cut back, it is necessary, after installation of the outer frame part, to maneuver the clamping members individually in space between the roofing and the solid canopy to bring them into a correct position and then screw them to the outer frame part. This maneuver is complicated and is thus time-consuming, and the holes for the screws are at a relatively high level in space, namely at about the level of the upper surface of the solid canopy that faces the roofing, and it is difficult to maneuver the screws between the surface of the solid canopy and the outer frame part that extends far downward.

Accordingly, the object of the invention is to provide a sun roof of this kind but installation of which in the vehicle roof is simplified and which can be attached with relatively large clamping force to the roofing of the vehicle.

The object is achieved according to the invention, by providing an inner frame part having a flange (clamping flange) to be extended under the roofing which can be pushed into a space between the roofing and the solid canopy. This flange may be continuous along the perimeter of the inner frame part or it may be formed in only one, but preferably, in several places of the frame rim, or it may consist of several spaced clamping members arranged along the perimeter of the frame, located radially relative to the perimeter, and rotatable about their axes. The other components of the inner frame part are located, therefore, in the area inside the roof opening. The flange, as a collar on the inner frame part, is relatively flat and represents, in relation to the roofing, substantially the highest portion of the inner frame part, extends substantially parallel to the roofing and engages the bottom surface of the roofing by its flat radial surface.

The invention achieves among others the following advantages:

The solid canopy need no longer be cut back at least at one of its opening edges, preferably at three or even all opening edges, in relation to the opening in the roofing. That is, the solid canopy, at least along a portion thereof will have an opening identical to the roof opening.

All work, such as sheet metal cutting, cutting the solid canopy, installation of the inner and outer frame parts can be conveniently performed from outside, that is, from above.

If the connection of the outer frame part with the inner frame part, takes place by means of a pivotable locking handle of the applicant, this connecting operation can also be performed from above.

Only the anchoring member that supports the solid canopy from beneath, when it is constructed, according to a further embodiment of the invention as an independent frame or as an independent frame member, must be installed from beneath; that is, from the vehicle interior.

The time necessary for subsequent installation of the sun roof according to the invention is considerably less and without sacrificing the advantages of sun roofs of this kind such as high firmness, high strength in the clamping zone on the roofing, as well as proper holding and fixing of the solid or clamping canopy.

Notwithstanding the above-mentioned advantages, it is possible, if desired, to form each of the inner frame part and the outer frame part as a one-piece molded plastic member.

When, according to another feature of the invention, the inner frame part comprises a connection element arranged between its clamping flange and its connection/fastening elements which connect the inner frame part with the outer frame part, extending within the opening of the roofing, and having a side surface preferably facing the solid canopy and inclined upward and outward in the direction of the flange, the connecting-/fastening elements for connecting the outer and inner frame parts with the roofing of the vehicle and for applying a clamping force such as screws or a pivotable handle, are easily accessible from beneath and in the most accessible part of the frame, namely, in the lowest part of the frame in relation to the vehicle interior. While, in general, various known materials can be used for manufacture of the inner and outer frame parts, such as metals and plastics, the above-mentioned solution is especially suitable for inner frame parts made of a plastic material especially when the outer frame part is made of a plastic material also. In this case, the outer and inner frame parts are respectively continuous; that is, the peripheral frame profiles are not interrupted. (German Pat. No. 3,246,396).

It is preferred, in the case of using the above-mentioned connection element, that the portion of the outer frame part next to the connection element and the connection element itself at its end located away from the solid canopy be inclined at the same angle. In this way, the portion of the outer frame part projecting into the roof opening can be kept relatively narrow which results in the greatest possible unobstructed opening area, and a sealing member for a flat cover of the sun roof can be favorably arranged with respect to forces acting thereon and available space. Good stability is achieved when the inner and outer frame parts, in the installed condition, are supported against each other along these inclined surfaces.

If, according to another feature of the invention, the outer and inner frame parts have corresponding pressure surfaces, and connecting/fastening elements such as screws, pivotal handle and the like for connecting the inner and outer frame parts are arranged in the space between the pressure surfaces, on one hand, and the clamping zone of the roofing on the other hand, clamping forces act favorably on the roofing. The effect of this measure is increased even more if, according to a further feature of the invention, the outer and inner frame parts are in contact with each other in a ready-mounted condition of the sun roof but are neither in force-locking nor in form-locking contact before being connected with the connection/fastening elements in the area between the pressure surfaces, on one hand, and the clamping zone of the roofing, on the other hand. This solution is especially convenient for sun roofs in which both the outer and the inner frame parts, as described above, are made of plastic.

The above-mentioned parts to be used according to the invention are subject to no special technical requirements as to their size, shape, choice of material, and technical concept, so that the known criteria of choice in the particular area of application can be used without limitations.

Further details, features and advantages of the subject invention will become clear from the description which follows with reference to respective drawings in which two preferred embodiments of the sun roof according to the invention are shown.

In the drawings:

FIG. 4 is a sectional view of another embodiment of the sun roof (along line IV—IV in FIGS. 1 and 2, with the cover in a closed position);

Figure 1:
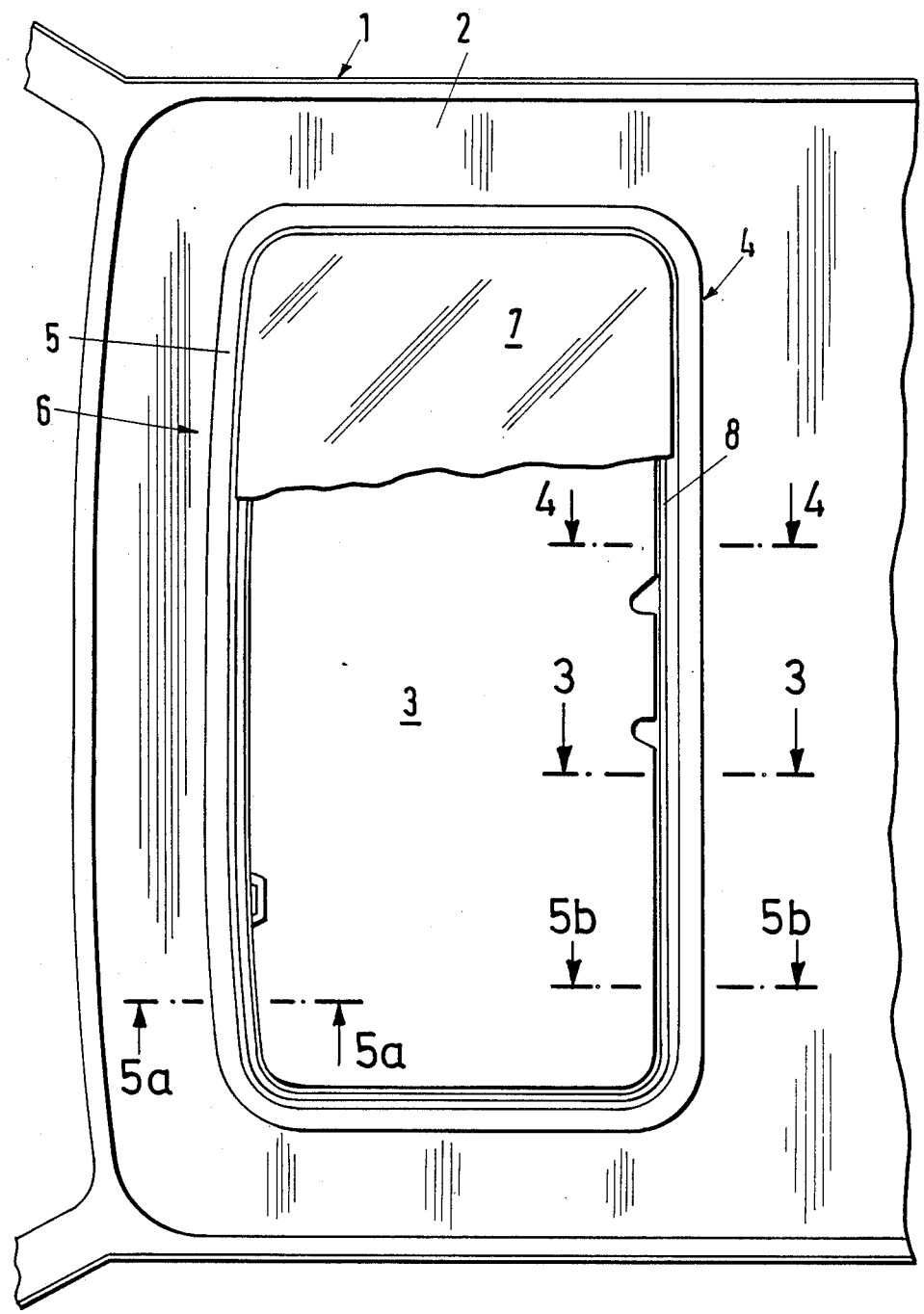
FIG. 1 is a top view of the sun roof according to the invention in a mounted condition (view A in FIGS. 3 and 4)

According to FIGS. 1 and 3 to 5b, roofing 2 of vehicle 1, made, i.e., of sheet metal or plastic material, has a roof opening 3 in which a sun roof 6 with a plate cover 7 can be installed. The cover can be raised at the rear end thereof or otherwise adjusted and is in substantial alignment with the roofing. In FIG. 1, only a continuous closed-contour outer frame part 5 of the frame 4 of the sun roof 6 which outer frame part is designed as a plastic molded part, the cover 7, (partly removed), and a surrounding sealing 8 are shown.

Figure 2:
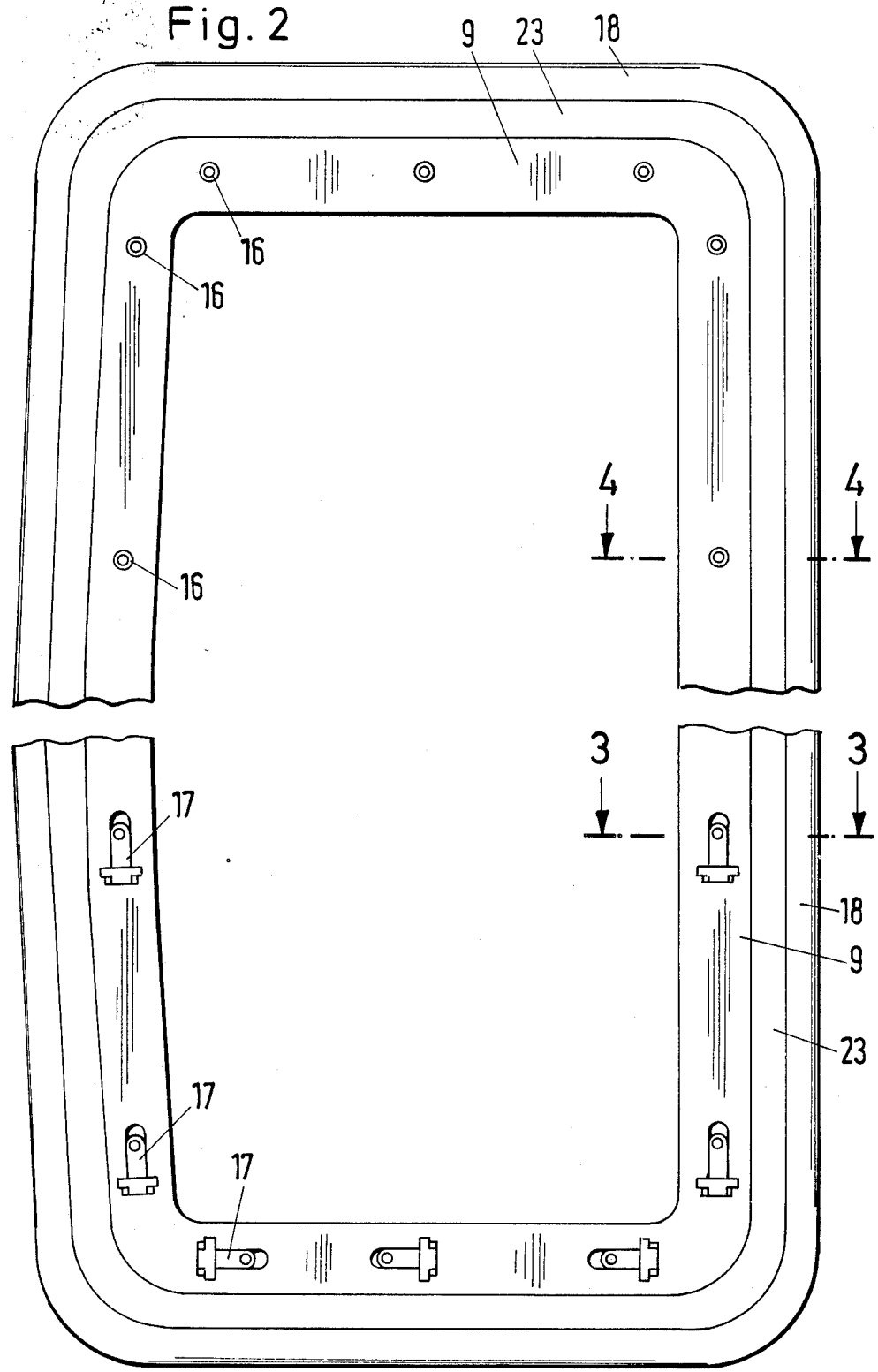
FIG. 2 is a bottom view of the inner frame part of the same sun roof (view B in the left half for the embodiment of FIG. 3, and view C in the right half for the embodiment of FIG. 4)

In the bottom view (FIG. 2), only the inner frame part 9 also made as a one-piece continuous closed-contour molded plastic part is shown. FIG. 2 shows two embodiments of the inner frame part 9, one which can be attached from above, and another which can be clamped from beneath. The outer frame part, the vehicle and other construction parts have been omitted for the sake of clarity.

Figure 3:
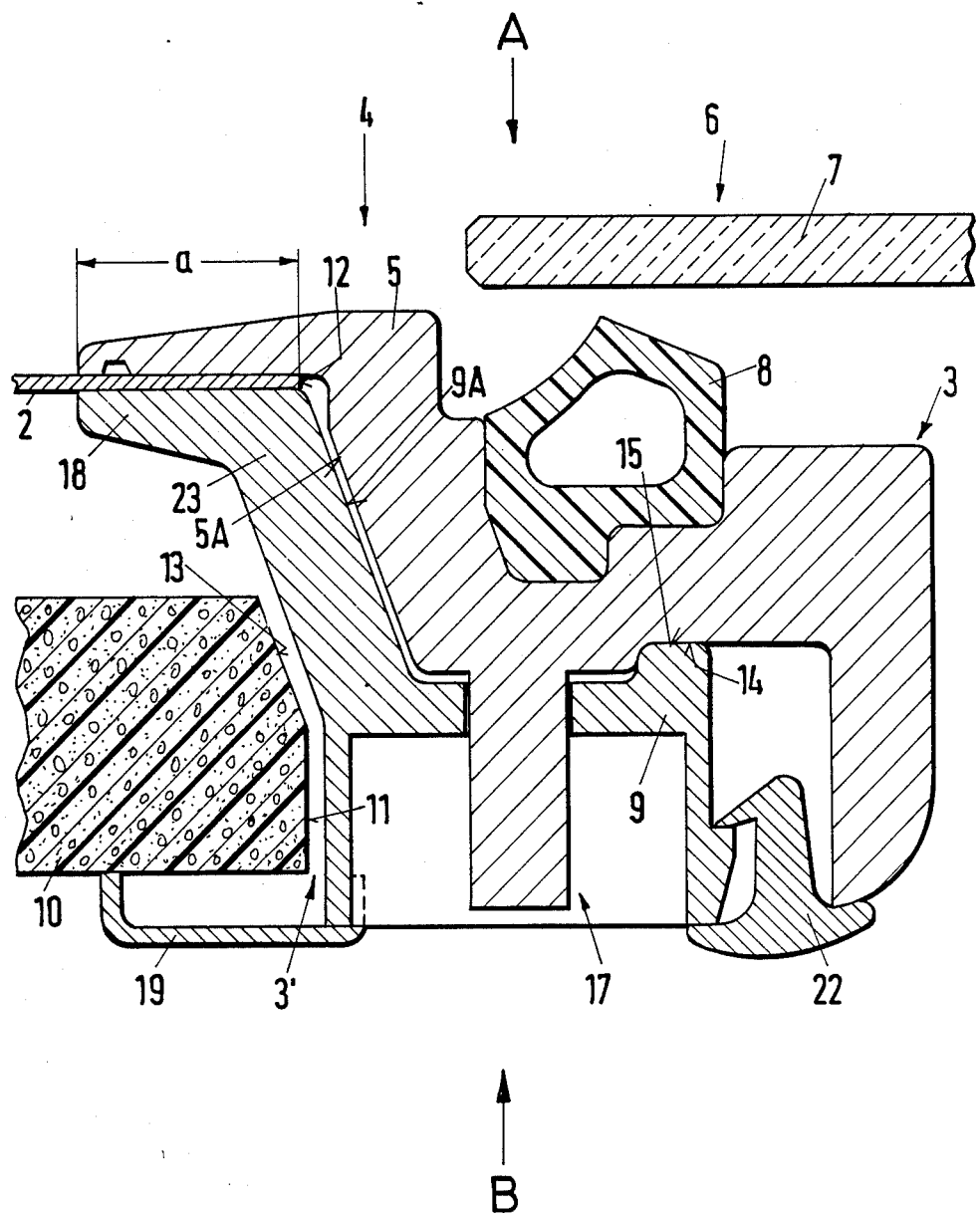
FIG. 3 is a sectional view of the same sun roof (section along the line III—III in FIGS. 1 and 2) with a flat cover lifted at the rear end thereof.

FIGS. 3 and 4 show a rigid lining in the form of a so-called solid canopy 10 located beneath the roofing 2. The canopy has an opening 3' which has the same size and profile as the roof opening 3 of the roofing 2. The cut-off surfaces 11 and 12 of the solid canopy 10 and the roofing 2, respectively, lie, therefore, approximately, in a common vertically extending plane, and the solid canopy 10 may have an undercut 13 adjacent to the roofing.

The outer and inner frame parts 5 and 9 have, in their zones within the roof openings 3, 3', respective pressure surfaces 14 and 15 which can be pressed together, on the one hand, by being secured with connection/fastening elements, such as screws 16 (FIG. 4 and FIG. 2 from above), or by locking handle 17 (FIG. 3 and FIG. 2 from beneath) mentioned previously. One the other hand, the outer and inner frame parts 5 and 9 clamp the roofing 2 therebetween. To this end, the inner frame part has, in the area located beneath the roofing 2 (clamping area a), a clamping flange 18, extending substantially parallel to the roofing. A connection element 23, inclined upward and outward, improves application of a clamping force to the roofing. The flange 18 can be located between the roofing 2, on one hand, and the solid canopy 10, on the other hand, if (as desired) the opening 3' in the solid canopy 10 is equal in size to the roof opening in the roofing 2.

The flange may be located in its position as from above so from beneath. The solid canopy 10 is not an absolutely rigid part, and it can be moved downward a certain distance, away from the roofing 2. The inner frame part 9 can first be tilted into the roof opening 3 or into the opening 3' of the solid canopy 10, then pushed at a straight angle, so that it is located between the roofing 2 and the solid canopy 10. Then, the inner frame part 9 is pivoted until the tilting is eliminated and the inner frame part is in a correct position. Then, the outer frame part 5 is set in from above, in a manner known per se, and then, in the known way, is connected with the inner frame part by the connection/fastening elements so that the two frame parts mutually apply pressure to each other, and their flanges apply pressure in the clamping zone a against the roofing 2. If in a particular vehicle, such a tilting (rotation) of the inner frame part is not possible, then on two opposite edges of the roof opening (near a corner of the frame part), a small undercut is made in the solid canopy through which the inner frame part can then be pushed in between the roofing and the solid canopy.

It is preferred to use the connection/fastening elements and, as can be seen in FIGS. 3 and 4, they are arranged between the clamping zone a, and respective pressure surfaces 14 and 15. Since the two frame parts are preferably not in contact in the clamping zone, (if desired) resilient clamping of the two frame parts may be used with the connection/fastening elements 16 and 17.

An anchoring member located beneath the solid canopy 10, circumscribing the frame 4, and designed as an independent frame 19 or 20, covers the frame 4, completely or in part from beneath (FIG. 4 and FIG. 3, respectively) and is fastened to the frame 4 by means of catch connections, for example. With a sufficiently elastic material of the solid canopy, an anchoring member 21 integrally formed with the inner frame part 9, is a short piece engaging the solid canopy 10 from beneath (shown in dash line in FIG. 4).

Another clamping profile 22, known per se, may be located in a circumferential groove defined by the outer and inner frame parts and serve for fixing of any cloth canopy which may be present in a vehicle, or for clamping the frame 20 (FIG. 4).

Figure 5A:
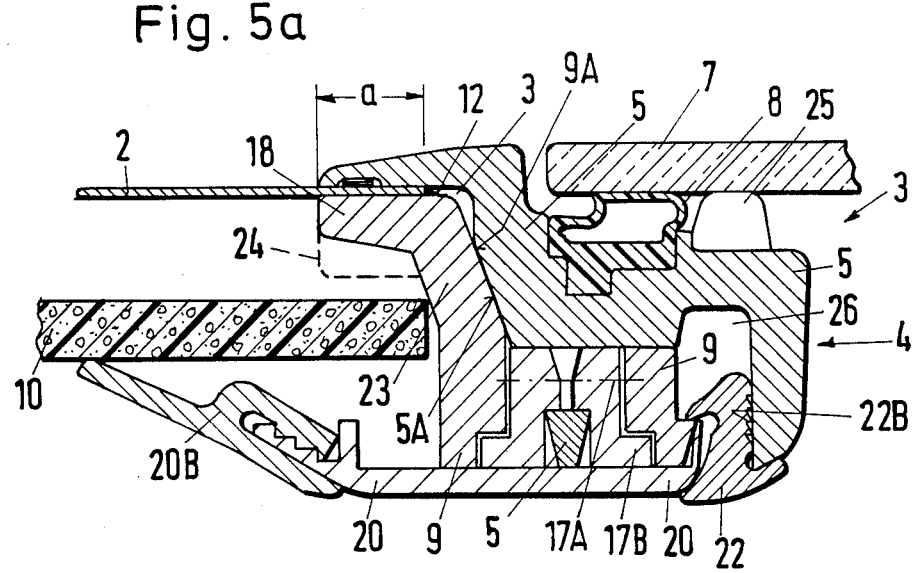
FIG. 5a is a sectional view of another embodiment of a sun roof, taken along the front frame profile along the line Va—Va in FIG. 1 (with cover closed)
Figure 5B:
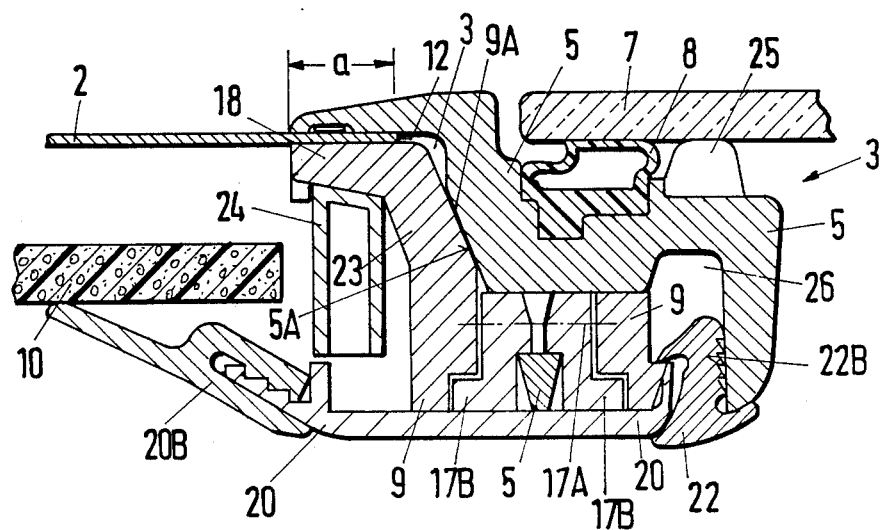
FIG. 5b is a sectional view of the sun roof taken along the rear frame profile along the line Vb—Vb in FIG. 1.

FIGS. 5a and 5b show an alternative embodiment. In this embodiment, the angle of inclination, length, and thickness of material of the connection element 23 and of the zone of the outer frame part 5 adjacent to the connection element 23 are different. The adjacent surfaces 5A and 9A of the outer frame part 5 and the inner frame part 9 extending outward and upward, are in contact in the installed condition as shown in the two figures. Also, a locking handle 17B, rotatable around an axis 17A, a stop element 25, as well as mounting member 20B which is height-adjustable in relation to the anchoring member 20, may be used as connection/fastening elements. By using the mounting member, the solid canopy 10 can be held, selectively, in a higher position than with the anchoring member 20 alone. The anchoring member 20 may be connected with the frame 4 not only by a clamping member 22, but also by other means at other points, not shown in the drawing. The anchoring member is eliminated if the vehicle roof has, instead of the solid canopy a so-called stretched canopy made from a cloth-like material which is then fastened with the same clamping member 22, in the same way as with the anchoring member 20. The clamping member 22 extends into a groove 26 formed between the outer and inner frame parts. The clamping member 22 preferably has a clamping lip 22B.

The clamping flange 18, shown in FIGS. 5a and 5b is (as in the embodiment according to FIGS. 3 and 4), a continuous projection circumscribing the inner frame part 9, and is made integral with the inner frame part 9. The clamping flange is present, therefore, on all edges and corner zones of the frame 4. Extensive studies have shown that at the rear edge of the sun roof 6, shown in FIG. 5b, especially high stresses act on the frame 4. These stresses mean, therefore, that, on one hand, in this zone, the bending moment of the roofing 2, especially near the middle line in the longitudinal direction, is smaller than at the other edges of the sun roof. On the other hand, an actuating member, not shown in the drawing, for opening and closing the cover 7, in many sun roofs, is located precisely in the middle of the front edge, and especially, the rear edge of the sun roof. For this reason, preferably at the front edge but especially at the rear edge of the sun roof (as shown in FIG. 5b), elongate reinforcing elements 24 are provided. They extend over the total length of the roof edge in question, or at least over the zones most stressed or weakened by bending. A reinforcing element 24 is formed so that its bending moment is especially large in a direction which is perpendicular to the roofing 2. The reinforcing element may, as indicated in broken line in FIG. 5b, be screwed to the clamping flange 18 from beneath or otherwise be connected with it. The reinforcing element may also be made integral with the inner frame part 9. Preferably, the reinforcing element 24 is designed as a bend-stiffening element for the clamping flange. If the clamping flange 18 is reinforced in this way over a part of its length and, therefore, cannot be pushed in or cannot be pushed easily between the roofing 2 and a solid canopy 10, as the clamping flanges shown in the other figures, this solution still lies within the framework of the invention, since the clamping flange in the other zones does not have a reinforcing element. With the reinforcing element 24, shown in FIG. 5b, the solid canopy 10 in the clamping undercut zone must be somewhat behind the cut surface 12 of the roofing 2.

According to FIG. 5a, the clamping flange 18, as shown in dash line, may, if desired, also be made thicker than elsewhere. Such a thickening may serve as a reinforcing and may be provided only in partial zones of the clamping flange 18, because of its shape. Again, complete pushing in between the roofing 2 and the solid canopy 10 is possible as long as the solid canopy 10 is not too thick.

I claim:

1. A sun roof to be installed in a roof opening (3) of a vehicle (1), in which a rigid lining (solid canopy 10) is located beneath the roofing (2) for receiving the sun roof (6), and comprising at least:
   (a) a cover (7) which can be opened and closed and which is substantially aligned with the roofing; and
   (b) a frame (4) consisting of several parts which can be clamped directly against the roofing (2) and including:
      (b1) a one-piece outer frame part (5) circumscribing the roof opening (3) and which can be mounted on the roofing (2) from above, and
      (b2) a one-piece inner frame part (9) circumscribing the roof opening (3), which can be rigidly joined with the outer frame part (5) in a zone within the roof opening (3) by means of connecting or fastening elements (16; 17; 17A; 17B) and which engages the roofing (2) from beneath, characterized in that the inner frame part (9) has a portion (a) extending under the roofing (2) in engagement therewith and designed as a flange (clamping flange 18) which can be pushed into the space between the roofing (2) and the solid canopy (10), and the solid canopy has, at least along one edge (cut surface 12) of the roof opening (3), an opening (3') identical to the roof opening (3).

2. A sun roof to be installed in a roof opening (3) of a vehicle (1), in which a rigid lining (solid canopy 10) is located beneath the roofing (2) for receiving the sun roof (6), and comprising at least:
   (a) a cover (7) which can be opened and closed and which is substantially aligned with the roofing; and
   (b) a frame (4) consisting of several parts which can be clamped directly against the roofing (2) and including:

(b1) a one-piece outer frame part (5) circumscribing the roof opening (3) and which can be mounted on the roofing (2) from above, and (b2) a one-piece inner frame part (9) circumscribing the roof opening (3), which can be rigidly joined with the outer frame part (5) in a zone within the roof opening (3) by means of connecting or fastening elements (16; 17; 17A; 17B) and which engages the roofing (2) from beneath, characterized in that the inner frame part (9) has a portion (a) extending under the roofing (2) in engagement therewith and designed as a flange (clamping flange 18) which can be pushed into the space between the roofing (2) and the solid canopy (10), and a connection element (23) located in the space between the clamping flange (18) and the connecting/fastening elements (16, 17, 17B) and which, at least on its side facing the solid canopy (10), is inclined upward and outward toward the clamping flange (18).

3. Sun roof according to claim 1, characterized in that the inner frame part (9) comprises a connection element (23) located between the clamping flange (18) and the connecting/fastening elements (16; 17; 17B) and comprising at least one side surface facing the solid canopy (10) which is inclined upward and outward toward the clamping flange (18).

4. Sun roof according to claim 2 or 3, characterized in that the connection element (23) comprises a second side surface remote from the solid canopy (10), which is also inclined upward and outward toward the clamping flange (18).

5. Sun roof according to claim 4, characterized in that the outer frame part (5) has a portion located adjacent to the connection element (23) and inclined in the same way as the connection element (23) on its side remote from the solid canopy (10).

6. Sun roof according to one of claims 1 or 2, characterized in that the outer and inner frame parts (5 and 9) have respective pressure surfaces (14 and 15) and that connecting/fastening elements (16; 17; 17B) for connecting the outer and inner frame parts (5 and 9) are arranged in the space between the pressure surfaces (14 and 15), on one hand, and the clamping area (a) of the roofing (2), on the other hand.

7. Sun roof according to claim 6, characterized in that the outer and inner frame parts (4 and 9), in the space between the pressure zones (14 and 15), on one hand, and the clamping area (a) of the roofing (2), on the other hand, are in contact in a ready-mounted condition of the sun roof (6).

8. Sun roof according to one of claims 1 or 2, characterized in that the clamping flange (18) of the inner frame part (9) consists of several spaced crossbars arranged around the periphery of the frame (4) and rotatable around an axis.

9. Sun roof according to one of claims 1 or 2, further comprising an anchoring member (19; 20; 20B; 21) for supporting the solid canopy from beneath.

10. Sun roof according to one of claims 1 or 2, characterized by comprising at least one reinforcing element (24) acting on a portion of the clamping flange (18).

11. Sun roof according to one of claims 1 or 2, characterized in that the inner and outer frame parts are designed, in each case, as a one-piece, continuously closed molded plastic part.

12. Sun roof according to claim 9 wherein the anchoring member is designed as an independent frame or as an independent frame profile.

* * * * *